United States Patent
Skur, III

(10) Patent No.: US 6,442,944 B1
(45) Date of Patent: Sep. 3, 2002

(54) BLEED AIR HEAT EXCHANGER INTEGRAL TO A JET ENGINE

(75) Inventor: Anthony I. Skur, III, Aledo, TX (US)

(73) Assignee: Lockheet Martin Corporation, Bethesda, MD (US)

( * ) Notice: Subject to any disclaimer, the term of this patent is extended or adjusted under 35 U.S.C. 154(b) by 0 days.

(21) Appl. No.: 09/697,933

(22) Filed: Oct. 26, 2000

(51) Int. Cl.[7] .............................. F02C 7/047; F02C 6/08
(52) U.S. Cl. ................... 60/782; 60/39.093; 244/134 R
(58) Field of Search ........................... 60/39.093, 39.07, 60/266, 204, 782; 244/134 R, 134 B

(56) References Cited

U.S. PATENT DOCUMENTS

| | | | | |
|---|---|---|---|---|
| 1,876,620 A | * | 9/1932 | Crossland | 244/134 B |
| 2,110,731 A | * | 3/1938 | Horrocks | 244/134 B |
| 2,594,118 A | * | 4/1952 | Boyd | 60/39.093 |
| 2,712,727 A | * | 7/1955 | Morley et al. | 60/39.093 |
| 2,747,365 A | * | 5/1956 | Rainbow | 60/39.093 |
| 2,777,301 A | * | 1/1957 | Kuhn | 60/39.07 |
| 3,116,789 A | * | 1/1964 | Kent | 60/39.093 |
| 3,341,114 A | * | 9/1967 | Larson | 60/39.092 |
| 3,981,466 A | * | 9/1976 | Shah et al. | 60/39.093 |
| 4,863,354 A | * | 9/1989 | Asselin et al. | 60/39.093 |

* cited by examiner

Primary Examiner—Ted Kim
(74) Attorney, Agent, or Firm—Baker Botts L.L.P.

(57) ABSTRACT

An apparatus for supplying hot bleed air for anti-icing of a jet engine and cooled bleed air to an environmental control system includes a first duct (17), a second duct (5) and a front frame (10) coupled to the front of a jet engine (23). The first duct (17) is positioned to route hot bleed air from the jet engine (23) to the front frame (10). The second duct (5) is positioned to receive cooled bleed air from the front frame (10) for routing to an environment control system of an aircraft. Regulating/shutoff valves (15) are connected in the first duct (17) to control the flow of the bleed air in accordance with conventional control techniques. The apparatus further includes an aerodynamic vane (3) to support the second duct (5).

6 Claims, 2 Drawing Sheets

US 6,442,944 B1

BLEED AIR HEAT EXCHANGER INTEGRAL TO A JET ENGINE

BACKGROUND OF THE INVENTION

Most of today's jet aircraft use bleed air extracted from a jet engine to prevent icing of the engine inlet ("anti-ice") and as a source of air for aircraft compartments. For anti-ice, the bleed air is routed to the engine inlet area. For environment control, the bleed air is routed to an environment control system (ECS) which conditions the bleed air, generates low pressure cold air, and controls the cooling of avionics, heating, cooling and pressurization of the cockpit. Because the temperature and pressure of the bleed air as extracted from the jet engine is too high for the use directly by the ECS, the temperature and pressure of the bleed air are lowered before being supplied to the ECS.

The traditional method for supplying anti-ice and cooled bleed air to the ECS used by jet aircraft involves splitting the hot bleed air from the jet engine into two parts; the first part for anti-ice and the second part for the ECS. The first part is routed to inlet guide vanes of the jet engine through a pressure regulating/shutoff valve that is controlled by an ice detecting sensor located in the engine inlet. The bleed air passes through the inlet guide vanes, a nose cone, and spills out through a shroud of the nose cone and routed back to the engine inlet along the surface of the cone. The second part of the bleed air is routed to a heat exchanger that uses ambient or ram air as a heat sink. The heat exchanger cools the hot bleed air, and the cooled bleed air is supplied to the ECS.

To optimize aircraft performance, there is a constant demand for aircraft designers to improve on weight, volume, efficiency, cost, and certain tactical factors unique to military applications. However, the current method for anti-ice and supplying bleed air to the ECS comes at a substantial cost to flight performance. It requires a dedicated ram air circuit and a heat exchanger, two separate sets of ducts and valves, and an ice detecting sensor. These requirements increase cost, weight, volume, drag, and decrease reliability. Also, the front frame of the engine must be designed with heavier material in case of a valve failure, leading to an increase in cost and weight. Engine efficiency is reduced because there is a higher bleed air use during icing condition. Furthermore, the dedicated ECS ram air circuit for cooling the bleed air requires openings on the aircraft's fuselage, increasing the aircraft's radar signature. For the foregoing reasons, there is a need for a cooled bleed air supplying apparatus that is lighter, smaller, efficient, reliable, and allows for reduced radar signature.

SUMMARY OF THE INVENTION

The present invention comprises an improved apparatus for anti-ice and supplying cooled bleed air and a method for anti-ice and supplying cooled bleed air that substantially reduces disadvantages and problems associated with previous apparatus for anti-ice and supplying cooled bleed air.

According to one embodiment of the invention, an apparatus for anti-ice and supplying cooled bleed air to an ECS of a jet aircraft includes a modified front frame of a jet engine optimized for cooling bleed air with minimal pressure drop. A first duct routes hot bleed air from the jet engine to the front frame. The front frame utilizes the hot bleed air to prevent engine inlet icing and cools the bleed air. A second duct routes the cooled bleed air from the nose cone of the front frame to the ECS.

In a particular embodiment, the first duct routes the hot bleed air from at least one compressor stage of the jet engine to the inlet guide vanes of the front frame. The flow of the hot bleed air in the first duct is controlled by pressure regulating/shutoff valves. The second duct is positioned to route the cooled bleed air from the nose cone of the front frame to the ECS, supported by an aerodynamic vane.

The present invention comprises apparatus for anti-ice and supplying cooled bleed air and provides a number of important technical advantages over current apparatus for anti-ice and supplying bleed air. The apparatus of the present invention does not utilize a dedicated ram air circuit and a heat exchanger for cooling the bleed air. It also does not require an extra bleed air valve, a duct for the bleed air routed to the heat exchanger, an ice detector sensor and associated circuits, and the need for a heavier engine front frame in case of anti-ice valve failure. The simplification of the apparatus reduces cost, weight, volume, and increases reliability. Drag and radar signature is also reduced due to the elimination of the ram air circuit. Furthermore, the reduction in bleed air use in icing conditions increases the efficiency of the engine. Other technical advantages are readily apparent to one skilled in the art from the following figures, descriptions, and claims.

BRIEF DESCRIPTION OF THE DRAWINGS

For a more complete understanding of the invention, and for further features and advantages thereof, reference is now made to the following description, taken in conjunction with the accompanying drawings, wherein.

DETAILED DESCRIPTION OF EXEMPLARY EMBODIMENTS

Figure 1:
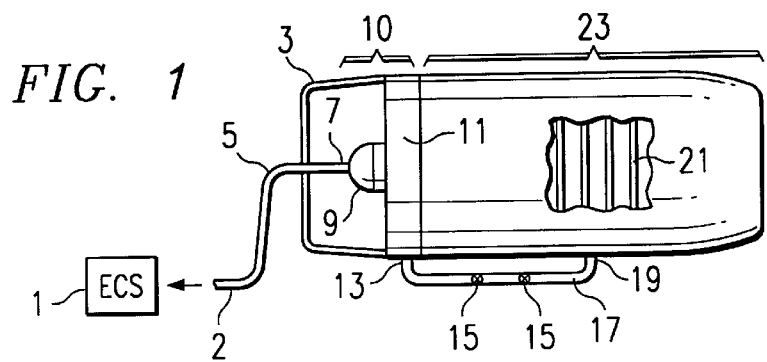
FIG. 1 is a schematic illustration of apparatus for supplying bleed air to an ECS from a jet engine in accordance with the present invention.
Figure 2:
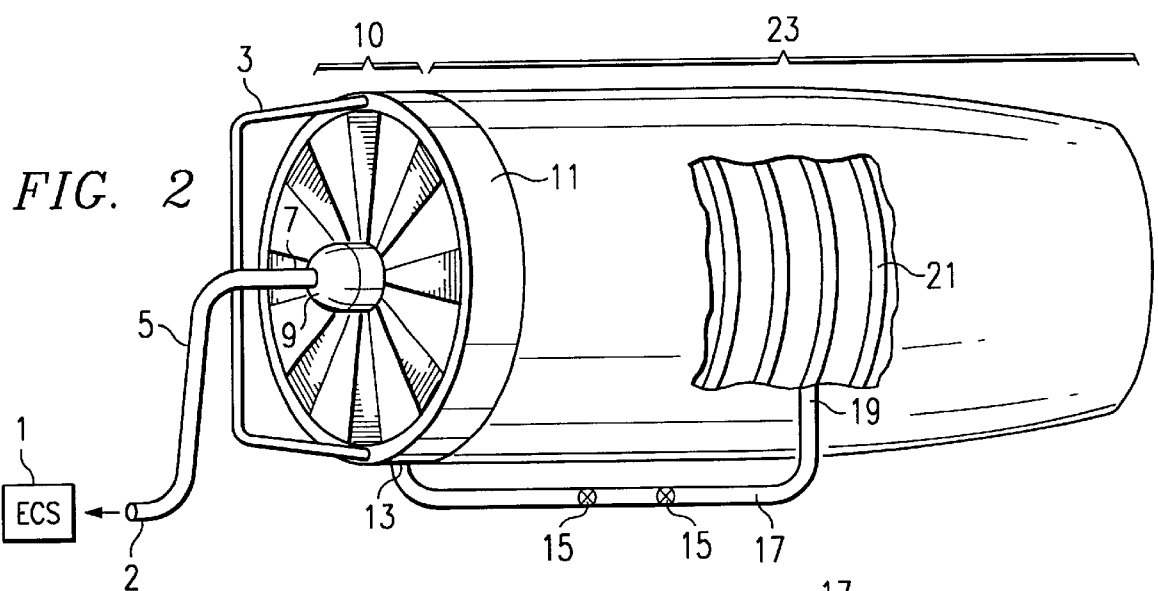
FIG. 2 illustrates apparatus for supplying bleed air from a jet engine and cooled bleed air to the ECS of an aircraft.

Referring to FIGS. 1 and 2, there is illustrated an exemplary apparatus for anti-ice control of a jet engine and supplying cooled bleed air to the environmental control system (ECS) of an aircraft including a first duct 17, a second duct 5 and a front frame 10. The hot bleed air is routed from a jet engine 23 (e.g., from one of the compressor stages 21) to the front frame 10 through the first duct 17. The front frame 10 functions to remove heat from the hot bleed air and the cooled bleed air is routed to the ECS 1 through the second duct 5.

The first duct 17 and the second duct 5 comprises ducts of any suitable shape, size, or material as determined by one skilled in the art, considering the environment in proximity to a jet engine. As illustrated in FIG. 2, the exit end 13 of the first duct 17 and the inlet end 7 of the second duct 5 are coupled to the front frame 10.

The exit end 2 of the second duct 5 is coupled to the ECS 1. The inlet end 19 of the first duct 17 is coupled to any suitable portion of the jet engine where hot bleed air is available. Regulating/shutoff valves 15 are included in the first duct 17 to control the flow of the bleed air. The number of regulating/shutoff valves 15 depends on the redundancy requirement of the aircraft design. The control of the valves 15 is in accordance with conventional bleed air techniques.

Figure 3:
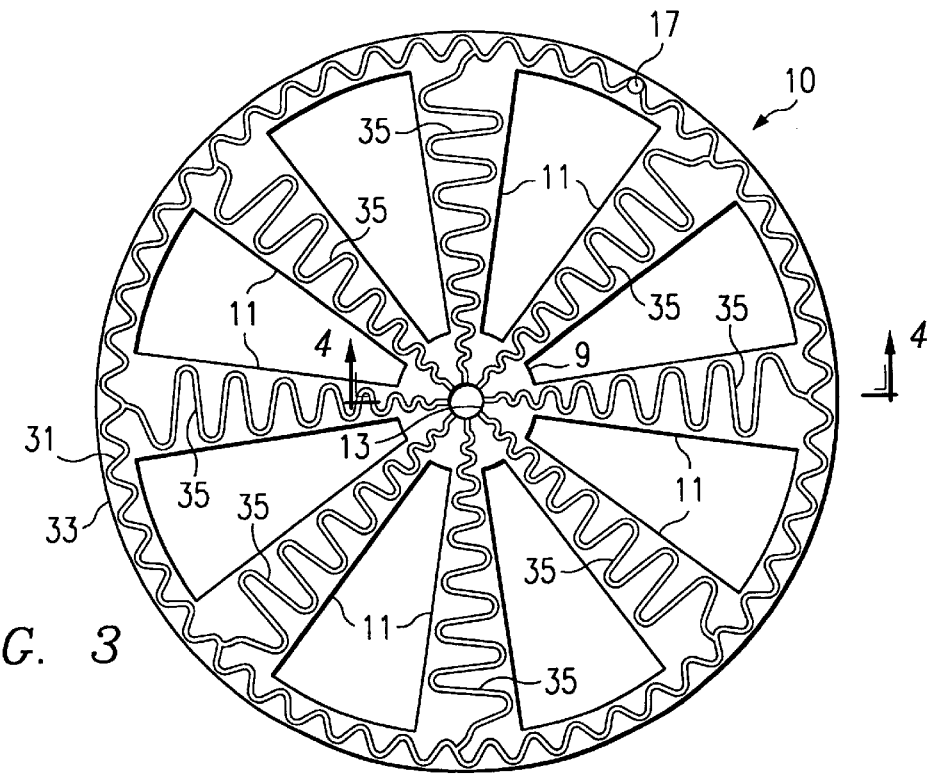
FIG. 3 is an illustration of a rear view, in cross-section of a front frame of the jet engine of FIG. 2.
Figure 5:
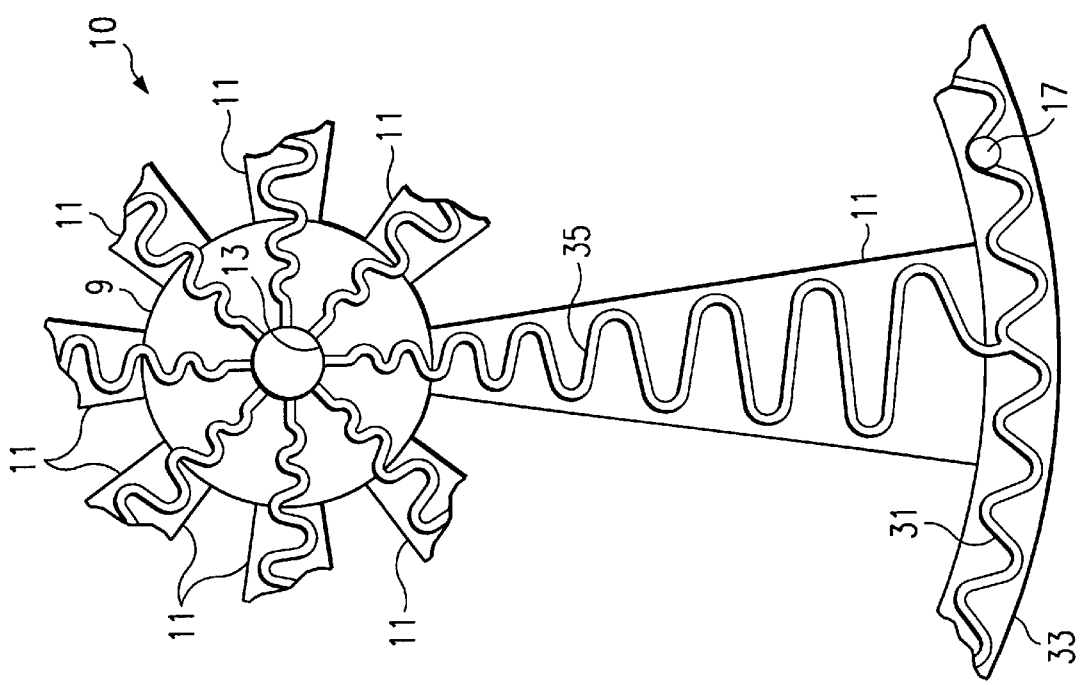
FIG. 5 is an expanded view in cross-section of one of the inlet guide vanes illustrating the bleed air paths for cooling the bleed air.
Figure 4:
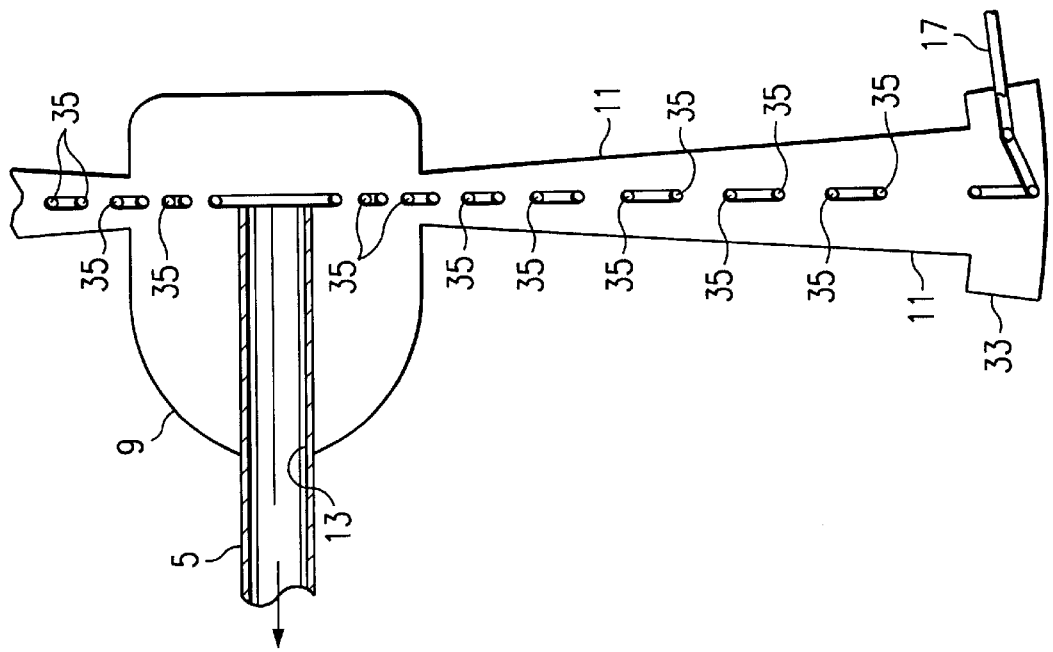
FIG. 4 is a cross-section of one of the inlet guide vanes of the front frame taken along the line 4—4 of FIG. 3.

Referring to FIGS. 3, 4 and 5, there is illustrated the front frame 10 including a nose cone 9 and inlet guide vanes 11. A supply of hot bleed air from the engine 23 is input to the front frame 10 by means of the first duct 17 connected to a manifold of a serpentine shaped path 31. The exit end 13 of each of the first ducts 17 is connected to the serpentine shaped path 31 contained within an outer ring 33 of the front frame 10. Each of the inlet guide vanes 11 also includes a serpentine shaped path 35 machined into the guide vane, wherein one end of each path 35 is connected to the path 31 of the outer ring 33 and a second end of each path 35 is connected to the inlet end 7 of the second duct 5 at the nose cone 9.

The specific configuration of the front frame 10 is determined in accordance with the specification of each jet engine, using design techniques to achieve anti-ice and cooling of the bleed air between the exit end 13 of the first duct 17 and the inlet end 7 of the second duct 5. In the embodiment as illustrated in FIG. 3, the serpentine paths 31 and 35 of the front frame 10 receives the hot bleed air and supplies cooled bleed air to the ECS 1 through the nose cone 9. In another embodiment of the invention, the hot bleed air is supplied to the nose cone 9 and the cool bleed air is supplied from the serpentine path 31 of the outer ring 33.

As illustrated in FIG. 2, the inlet end 19 of the first duct 17 is coupled to the compressor stages 21 of the jet engine 23. The exit end 13 of the first duct 17 is coupled to the serpentine path 31 of the front frame 10. The inlet end 7 of the first duct 5 is coupled to the nose cone 9 of the front frame 10. The first duct 5 is supported by an aerodynamic vane 3.

In operation, the hot bleed air is routed from the compressor stages 21 to the inlet guide vanes 11 through the first duct 17. The regulating/shutoff valves 15 connected in the first duct 17 controls the flow rate of the hot bleed air to the inlet guide vanes 11. Upon entering the serpentine path 35 of the inlet guide vanes 11, the hot bleed air provides heat to the front frame 10 for engine anti-icing as a result of distribution of the hot bleed air through the inlet guide vanes 11. The hot bleed air loses heat during distribution through the paths 35 of the inlet guide vanes 11 and this cooled bleed air enters the nose cone 9. The cooled bleed air is routed from the nose cone 9 to the ECS 1 through the second duct 5.

Although the present invention has been described with reference to several embodiments, changes, substitutions, variations, alterations, and modifications may be suggested to one skilled in the art, and the intention is that the invention encompass all such changes, substitutions, variations, alterations, and modifications falling within the spirit and scope of the appended claims.

What is claimed is:

1. A method for supplying cooled bleed air from a jet engine to an environmental control system of an aircraft, comprising:

routing hot bleed air from the jet engine to a first serpentine path comprising an outer ring of a front frame of the jet engine;

passing the hot bleed air from the jet engine through the first serpentine path;

passing the hot bleed air through each of a plurality of second serpentine paths positioned in guide vanes and fluidly coupled to the first serpentine path, the guide vanes being positioned in the front frame;

routing the bleed air from each of the plurality of second serpentine paths to the environmental control system of the aircraft.

2. The method of claim 1, further comprising:

routing the hot bleed air from a compressor stage of the jet engine to inlet guide vanes of the front frame; and routing the cooled bleed air from a nose cone of the front frame.

3. Apparatus for supplying cooled bleed air to an environment control system of an aircraft having at least one jet engine, comprising:

a front frame comprising an outer ring, a plurality of guide vanes, and a nose cone, each of the plurality of guide vanes having one end coupled to the outer ring and a second end coupled to the nose cone, the front frame coupled to the inlet of the jet engine;

a first duct having an inlet end positioned to receive hot bleed air from the jet engine and an exit end positioned to supply the bleed air to the front frame;

a second duct having an inlet end positioned to receive cooled bleed air from the front frame of the jet engine and an exit end positioned for supplying the cooled bleed air to the environment control system;

an outer ring serpentine shaped path positioned in the outer ring and having a manifold coupled to the exit end of the first duct; and a plurality of guide vane serpentine shaped paths, each guide vane serpentine shaped path individually positioned in one of the plurality of guide vanes and having a first end coupled to the inlet end of the second duct and a second end coupled to receive bleed air from the outer ring serpentine shaped path.

4. The apparatus as set forth in claim 3 wherein the second end of each of the plurality of guide vane serpentine shaped paths comprises a coupling to the outer ring shaped path and substantially equally spaced circumferentially.

5. The apparatus as set forth in claim 3 wherein the plurality of guide vane serpentine paths extend radially inward from the outer ring to the nose cone.

6. The apparatus of claim 3 wherein the second duct comprises the inlet end coupled to the nose cone of the front frame.

* * * * *

UNITED STATES PATENT AND TRADEMARK OFFICE
CERTIFICATE OF CORRECTION

PATENT NO. : 6,442,944 B1
DATED : September 3, 2002
INVENTOR(S) : Anthony I. Skur, III It is certified that error appears in the above-identified patent and that said Letters Patent is hereby corrected as shown below:

<u>Title page,</u>
Item [73], after "Assignee:", delete "Lockheet Martin Corporation," insert
-- Lockheed Martin Corporation --.

<u>Column 1,</u>
Line 3, insert
-- TECHNICAL FIELD OF THE INVENTION
This invention relates generally to apparatus for control of engine inlet icing of a jet engine and supplying cooled bleed air to an environmental control system, and more specifically, control of jet engine icing and cooling the hot bleed air utilizing channels in the front frame of a jet engine. --

Signed and Sealed this

Eighteenth Day of May, 2004

JON W. DUDAS
*Acting Director of the United States Patent and Trademark Office*